United States Patent
Lesso (10) Patent No.: US 11,693,626 B2
(45) Date of Patent: Jul. 4, 2023

(54) VARIABLE ACCURACY COMPUTING SYSTEM

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 460 days.

(21) Appl. No.: 15/931,860

(22) Filed: May 14, 2020

(65) Prior Publication Data
US 2020/0401373 A1    Dec. 24, 2020

Related U.S. Application Data

(60) Provisional application No. 62/862,765, filed on Jun. 18, 2019.

(51) Int. Cl.
*G06F 7/523*      (2006.01)
*G06G 7/16*      (2006.01)
(52) U.S. Cl.
CPC ............... *G06F 7/523* (2013.01); *G06G 7/16* (2013.01); *G06F 2207/382* (2013.01)

(58) Field of Classification Search
CPC ........ G06F 2207/3816–382; G06F 2207/4824; G06F 9/30014; G06F 7/15–153; G06F 7/16; G06F 7/523; G06F 7/5443; G06G 7/16
See application file for complete search history.

(56) References Cited

U.S. PATENT DOCUMENTS

| | | | | |
|---|---|---|---|---|
| 10,452,472 | B1 * | 10/2019 | Graves | G06F 11/1048 |
| 2010/0002572 | A1 * | 1/2010 | Garrett | H04L 27/2651 370/210 |
| 2013/0191432 | A1 * | 7/2013 | Hickey | G06F 7/5443 708/495 |
| 2014/0280430 | A1 * | 9/2014 | Kim | G06F 7/49942 708/835 |
| 2019/0304053 | A1 * | 10/2019 | Ould-Ahmed-Vall | G06F 12/0811 |

\* cited by examiner

*Primary Examiner* — Matthew D Sandifer
(74) *Attorney, Agent, or Firm* — Jackson Walker L.L.P.

(57) ABSTRACT

The present disclosure relates to a computing system. The computing system comprises a data input configured to receive an input data signal, a computation unit having an input coupled with the data input, the computation unit being operative to apply a weight to a signal received at its input to generate a weighted output signal, and a controller. The controller is configured to monitor a parameter of the input signal and/or a parameter of the output signal and to issue a control signal to the computation unit to control a level of accuracy of the weighted output signal based at least in part on the monitored parameter.

21 Claims, 8 Drawing Sheets

VARIABLE ACCURACY COMPUTING SYSTEM

FIELD OF THE INVENTION

The present disclosure relates to the field of variable accuracy computing systems.

BACKGROUND

There are a number of applications which may, in operation, require a significant amount of computation. Computing is often performed in the purely digital domain using suitable processors, e.g. based on the Von Neumann architecture. There are some applications however where it may be advantageous to perform computation, at least partly, in the analog domain.

For instance, artificial neural networks (ANNs) are increasingly being proposed for use in a number of different areas, e.g. for classification or recognition purposes. In simplistic terms, an artificial neural network includes an input layer of nodes or neurons, an output layer of nodes or neurons and, optionally, one or more layers (often referred to as "hidden layers") of nodes or neurons intermediate the input layer and the output layer. Each layer is connected to its successor layer by connections between the nodes of the layers that transfer data from a node of a layer to a node of the successor layer.

Each node or neuron of a layer typically has multiple inputs, and a weight is assigned to each input of each node in a learning or training stage. During this learning or training stage, known training data is supplied to a layer of the neural network and individual neurons of the layer assign weights to their inputs based on the task being performed. By comparing the resultant outputs with the known training data, and repeating over a series of iterations, the neural network learns the optimum weights to assign to the inputs of the neurons for the task being performed.

During subsequent use of the neural network, operational input data is supplied to the input layer of the neural network. Data applied to a neuron of the input layer is weighted according to the weights assigned to the inputs of the neuron—i.e. the neuron applies the weight assigned to each of its inputs to the data received at the respective inputs. The neuron sums the weighted input data and performs a non-linear activation function on the sum of the weighted input data to generate an output data value, which is transmitted to one or more neurons of the next layer of the neural network, which may be an output layer or an intermediate layer. The use of a trained neural network to apply weights to operational input data is known as inference.

Traditionally the training and inference stages have been performed by centralised servers or "in the cloud", receiving inputs from and providing resultant outputs to so-called "edge" devices, e.g. mobile phones, tablet computers, "smart" devices etc. However, increasingly there is a drive to provide neural nets for inference locally in such devices, which may receive trained weights from training processes performed remotely.

The trend towards providing local neural nets and inference systems within edge devices is driving requirements for increased flexibility in such neural networks and inference systems.

SUMMARY

According to a first aspect the invention provides a computing system comprising:

a data input configured to receive an input data signal;

a computation unit having an input coupled with the data input, the computation unit being operative to apply a weight to a signal received at its input to generate a weighted output signal; and a controller, wherein the controller is configured to monitor a parameter of the input signal and/or a parameter of the output signal and to issue a control signal to the computation unit to control a level of accuracy of the weighted output signal based at least in part on the monitored parameter.

The computation unit may be operative, in response to the control signal, to adjust a number of bits of the input data signal that are used by the computation unit to generate the weighted output signal.

For example, the computation unit may be operative to prevent use of one or more least significant bits of the input data signal from being used by the computation unit to generate the weighted output signal.

Additionally or alternatively, the computation unit may be operative, in response to the control signal, to adjust a number of bits of the weight that are used by the computation unit to generate the weighted output signal.

For example, the computation unit may be operative to prevent use of one or more least significant bits of the weight from being used by the computation unit to generate the weighted output signal.

Additionally or alternatively, the computation unit may be operative, in response to the control signal, to adjust a number of bits that are provided for the weighted output signal.

The input data signal may comprise an audio signal, for example.

The parameter of the input signal monitored by the controller may comprise one or more of:
a signal to noise ratio;
a noise level;
a direct to reverberate ratio;
an average spectrum;
a spectral tilt;
Mel-frequency cepstral coefficients (MFCCs) or a property derived therefrom;
a long-term spectrum of the input signal;
an indication of narrowband interference in the input signal;
an indication of voice activity detection (VAD) in the input signal; and/or
an indication of automatic speech recognition (ASR) confidence for the input signal.

The parameter of the output signal monitored by the controller may comprise one or more of:
a metric indicative of class discriminability of the output of the computation unit;
a difference between the output signal and one or more thresholds; Kullback Leibler (KL) divergence;
a statistical distance metric between outputs of the computation unit;
a mean, standard deviation (STD), skew or kurtosis of the output signal in comparison to typical values.

The computation unit may comprise a crossbar array.

The crossbar array may be configured to perform parallel computation on bits of the input data signal.

The crossbar array may comprise:
a plurality of row electrodes, each of the plurality of row electrodes having a respective input terminal;

a plurality of column electrodes, each of the plurality of column electrodes having a respective output terminal; and a plurality of computation elements, wherein each of the plurality of computation elements is coupled to one of the plurality of row electrodes and to one of the plurality of column electrodes, and is configured to output a signal representative of the product of a value of a signal received at the input terminal of the row electrode to which it is coupled and a weight value associated with the computation element, and wherein in response to receiving a control signal from the controller to reduce the level of accuracy of the output of the computation unit, the computation unit is operative to:

disable one or more of the row electrodes; or disable one or more of the column electrodes.

The crossbar array may further comprise:

a plurality of multipliers, each of the plurality of multipliers having an input coupled to the output terminal of a respective one of the plurality of column electrodes; and a summation unit coupled to outputs of the plurality of multipliers, the summation unit being operative to output a signal representing a sum of values represented by the outputs of the plurality of multipliers, wherein each of the plurality of multipliers is configured to apply a binary weighting to a signal received at its input and to output a binary weighted signal to the summation unit.

Alternatively, the crossbar array may be configured to perform computation on bits of the input data signal sequentially.

The crossbar array may comprise:

a row electrode having an input terminal;

a plurality of column electrodes, each of the plurality of column electrodes having a respective output terminal; and a plurality of computation elements, wherein each of the plurality of computation elements is coupled to the row electrode and to one of the plurality of column electrodes, and is configured to output a signal representative of the product of a value of a signal received at the input terminal of the row electrode and a weight value associated with the computation element, and wherein in response to receiving a control signal from the controller to reduce the level of accuracy of the output of the computation unit, the computation unit is operative to:

disable the row electrode for a predetermined period of time; or disable one or more of the column electrodes for a predetermined period of time.

The crossbar array may further comprise:

a plurality of multipliers, each of the plurality of multipliers having an input coupled to the output terminal of a respective one of the plurality of column electrodes; and a summation unit coupled to outputs of the plurality of multipliers, the summation unit being operative to output a signal representing a sum of values represented by the outputs of the plurality of multipliers; and an accumulator coupled to an output of the summation unit;

wherein each of the plurality of multipliers is configured to apply a binary weighting to a signal received at its input and to output a binary weighted signal to the summation unit.

The computing system may comprise analog neural network circuitry.

The controller may be operative to monitor an environmental parameter of the computation unit and to issue a control signal to the computation unit to control a level of accuracy of the weighted output signal based at least in part on the monitored environmental parameter.

The environmental parameter may comprise a supply voltage or a temperature of the computation unit.

The computation unit may be a digital computation unit configured to perform bit-series computation of bits of the input data signal and the weight.

According to a second aspect the invention provides an integrated circuit comprising a computing system according to the first aspect.

According to a third aspect the invention provides a device comprising an integrated circuit according to the second aspect.

The device may be a mobile telephone, a tablet or laptop computer or an Internet of Things (IoT) device, for example.

According to a fourth aspect the invention provides a computing method comprising:

receiving, at a data input of a computing system, an input data signal;

applying, by a computation unit having an input coupled with the data input, a weight to a signal received at its input to generate a weighted output signal; and monitoring, by a controller, a parameter of the input signal and/or a parameter of the output signal and to controlling, by the controller, a level of accuracy of the weighted output signal based at least in part on the monitored parameter.

BRIEF DESCRIPTION OF THE DRAWINGS

Embodiments of the invention will now be described, strictly by way of example only, with reference to the accompanying drawings, of which.

DETAILED DESCRIPTION

Figure 1:
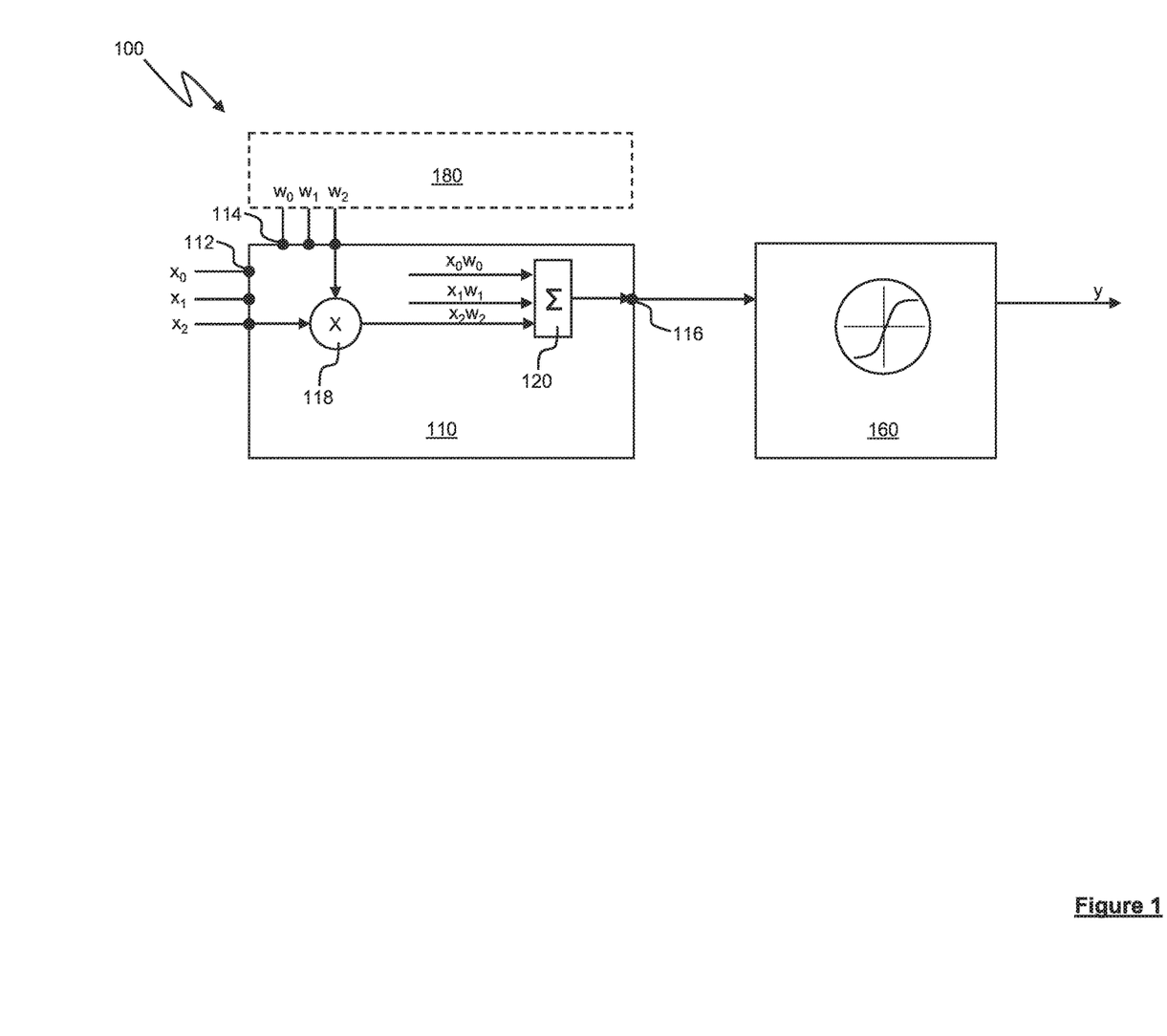
FIG. 1 is a simplified schematic representation of a neuron for an artificial neural network (ANN)

Referring first to FIG. 1, a neuron for an artificial neural network (ANN) is shown generally at 100, and comprises a dot product engine 110 and an activation function unit 160.

A neuron of a neural network can be modelled, in part, by a vector multiplication operation, multiplying a vector of input values (representing the inputs to the neuron) by a vector of weights or coefficients (representing the weights applied by the neuron to its inputs) to generate an intermediate output value (representing the sum of the results of the multiplication of each input value with the corresponding weight value, i.e. the dot product of the input vector and the weight vector). This intermediate output value is then subjected to an activation function to provide the neuron output.

The dot product engine 110 of FIG. 1 is configured to calculate the dot product of a plurality (in this example three) of input signals and a plurality (in this example three) of weight signals, by multiplying each input with a corresponding weight and summing the results of the multiplication to generate a single output value. Thus the dot product engine implements part of the functionality of a neuron of a neural network.

To this end, the dot product engine 110 has a plurality of parallel data input terminals 112 for receiving input data signals, a plurality of weight input terminals 114 for receiving weight data signals, and a data output terminal 116 for outputting a result of a calculation of the dot product of the input data signals and the weight data signals.

The dot product engine 110 further includes a plurality of computation elements 118 (of which, for the sake of clarity, only one is shown in FIG. 1) and a summation unit 120. The computation elements 118 may be digital computation elements or analog computation elements. In the case where the computation elements 118 are digital computation elements, the dot product engine 110 may be referred to as a digital dot product engine, whereas if the computation elements 118 are analog computation elements the dot product engine 110 may be referred to as an analog dot product engine.

In one example, the computation elements 118 may be based on memristors, in which case the weight data signals received by the dot product engine 110 via the weight input terminals 114 may be, for example, signals that are used to program the computation elements 118 with weight data. Alternatively, the computation elements may comprise other forms of non-volatile analog memory elements, for example based on floating-gate structures, or may comprise non-volatile digital memory elements used to digitally configure analog elements, for example the values of switched capacitors or the values of current sources.

As used herein the term memristor or memristive element may refer to an electronic element that has a variable resistance which can be controllably varied and which has some memory such that a particular resistance state persists in the absence of applied power. Binary memristors have been proposed, for instance based on MRAM (Magnetoresistive random-access memory) or ReRAM (Resistive random-access memory) memory, that can exhibit either a high resistance state or a low resistance state and can be selectively programmed to operate in the desired state, for instance by applying suitable programming voltages. An individual MRAM or ReRAM memory or memristor may thus be used as binary memristor and can be seen as a type of programmable memory.

However there may be other types of programmable-resistance memory component that can be selectively controlled to adopt one of two different states, where each state exhibits a different resistance or conductance, and the selected state persists once programmed. For instance programmable-resistance memory components could comprise or be based on flash-based memory e.g. floating-gate technologies such as ESF3, charge-trap technologies such as Silicon-Oxide-Nitride-Oxide-Silicon technologies, fuses (polysilicon or metal), carbon nanotubes or some non-memristive MRAM technologies such as spintronic technology, or phase-change memory. In general, any suitable programmable-resistance memory component could be used as a binary memory component in place of at least some of the binary memristors or computation elements described in the various embodiments.

Where the computation elements 118 are digital computation elements, the weight data signals may be received from a memory 180, external to the dot product engine 110, which stores weight values, though the weight data may also be stored locally in the digital computation element.

In use of the system 100, input data signals $x_0$, $x_1$, $x_2$ are received at the data input terminals 112 of the dot product engine 110. A computation element 118 of the dot product engine 110 multiplies each received input signal $x_0$, $x_1$, $x_2$ with a corresponding weight $w_0$, $w_1$, $w_2$ and outputs an output signal representing the result of the multiplication to the summation unit 120. For example, as shown in FIG. 1, a computation element 118 of the dot product engine 110 calculates the product of input signal $x_2$ and weight $w_2$ and outputs a signal representing the result $x_2 w_2$ of this multiplication to the summation unit 120.

The summation unit 120 sums the results $x_0 w_0$, $x_1 w_1$, $x_2 w_2$ of the multiplication operations performed by the computation elements 118 and outputs a dot product output signal representing the sum of the multiplication operations to the non-linear activation function 160, via the output terminal 116 of the dot product engine 110.

The non-linear activation function 160 performs a non-linear activation function on the dot product output signal. For example, the non-linear activation function unit 160 may compare the magnitude of the dot product output signal to a threshold, and output an output signal y having a magnitude equal to that of the dot product output signal if the magnitude of the dot product output signal meets or exceeds the threshold. If the magnitude of the dot product output signal is below the threshold, the non-linear activation function unit 160 may output a zero or a signal having some other constant magnitude. It will be understood that this is a simple example of a non-linear activation function, and that alternative non-linear functions may be used as required by the particular circumstances and application of the net in which the neuron 100 is used. For example, the non-linear activation function may include or be based on a non-linear function such as a cube, square, ReLU, sigmoid, tan h. Other suitable non-linear functions will be familiar to those skilled in the art.

Figure 2:
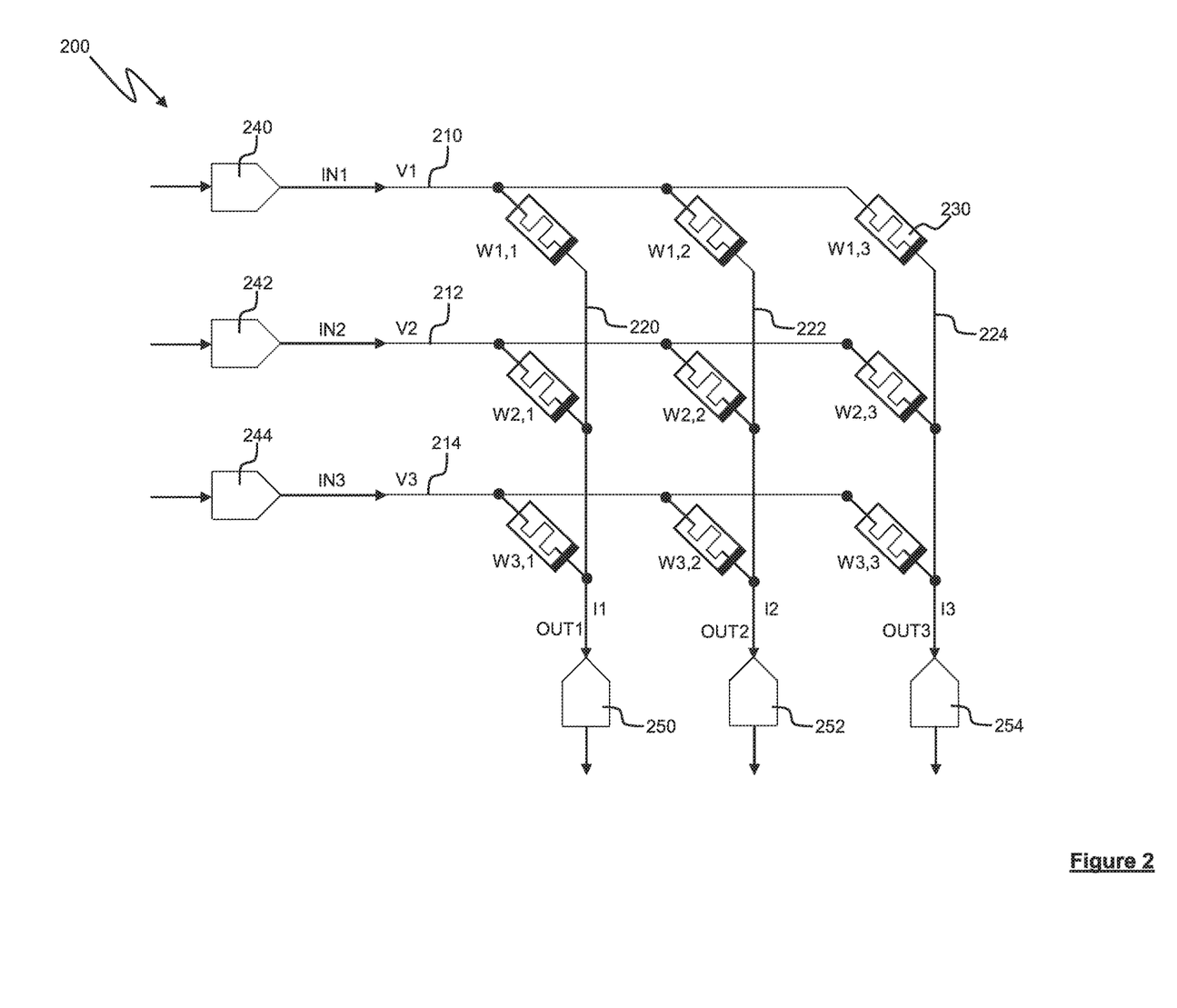
FIG. 2 is a simplified schematic representation of an analog crossbar array for use in an analog computing system implementing at least part of an artificial neural network.

FIG. 2 is a schematic representation of a crossbar array 200 for use in an analog implementation of a neuron for an artificial neural network, e.g. the neuron 100 of FIG. 1. In this example the crossbar array uses memristive elements as combined storage and computation elements (referred to hereinafter as computation elements), but it will be appreciated by those skilled in the art that that alternative computation elements could be used.

The crossbar array includes a plurality (in this example three) of first electrodes (e.g. row electrodes) 210, 212, 214 and a plurality (in this example three) of second electrodes (e.g. column electrodes) 220, 222, 224 arranged to overlap with the plurality of row electrodes 210, 212, 214. Thus, the example crossbar array illustrated in FIG. 2 is a 3×3 crossbar array, though of course crossbar arrays of different dimensions are possible. Each of the row electrodes 210, 212, 214 is coupled to each of the column electrodes 220, 222, 224 via a respective computation element. In the examples described herein the computation elements are memristive elements, but it is to be appreciated that the principles described in the present disclosure are equally applicable to any combined computation and storage element, such as the programmable-resistance memory components discussed above.

To programme the crossbar array 200, programming voltage pulses may be applied to the column electrodes 220, 222, 224 while a write voltage is applied to one of the row electrodes (e.g. row electrode 210) so as to create a resultant voltage to program the resistance state of each of the memristive elements 230 of that row. The other row electrodes (e.g. row electrodes 212, 214) may be held at a voltage level such that the resultant voltage experienced by the memristive elements of these other rows is insufficient to change the resistance state of the memristive element. The crossbar array 200 may be programmed in this way, row by row. Once programmed, the memory can be read out, row by row, by applying a read pulse to the relevant row and monitoring each column to determine the resistance state of the relevant memristive elements.

Once suitably programmed the crossbar array 200 can be used to perform computation operations.

The row electrodes 210, 212, 214 are arranged as inputs IN1, IN2, IN3 and the column electrodes 220, 222, 224 are arranged as outputs OUT1, OUT2, OUTS. It will be understood however that the principle could apply to a different number of inputs and/or outputs and the number of inputs could be different to the number of outputs. Each input is connected to each output via a respective memristive element 230.

In the example of FIG. 2, input data may be provided to each input of the array as a respective voltage level, V1, V2, V3. Each output will provide a respective output current I1, I2, I3. A given output will receive a contribution of current from each input, where the respective current contribution depends on the respective voltage at that input and the resistance state of the relevant memristive element. Simplistically, if each output were considered to be held at ground or be a virtual earth, the current contribution at a given output k from a given input j will be equal to the voltage Vj at input j multiplied by the conductance Gj,k of the memristive element linking input j to output k (and where the conductance Gj,k is the inverse of the resistance of the relevant memristive element, i.e. Gj,k=1/Rj,k where Rj,k is the resistance of the relevant memristive element). In this example a given output thus receives a contribution to the overall current output current from each input, where the current contribution is equal to the product of the voltage at that input and the conductance of the relevant memristive element. The overall current output may be regarded as representing the dot product Gk·V=ΣGj,k·Vj of a vector V comprising the set of voltages Vj with a vector Gk comprising the set of conductances {Gj,k; j=1 . . . }.

The conductance Gj,k of the memristive element, i.e. 1/Rj,k, can thus be seen as a weight Wj,k applied to the data at input j for output k. If suitable data is applied simultaneously to multiple inputs, the output current at a given output is a sum of the weighted contributions from the various inputs. This output current could be processed as an analogue current variable or converted into a corresponding voltage. It can therefore be seen that the crossbar array illustrated in FIG. 2 performs simultaneous dot product calculations for the various input data values with stored weight values, without requiring a separate memory read process and automatically provides a sum of the relevant weighted input values for a given output.

In some applications input data on which computation operations are to be performed by the crossbar array 200 may be provided as digital signals, and digital output signals representing the results of the computations performed by the crossbar array may be desired. Thus, a system in which the crossbar array 200 is employed may include a plurality of digital to analog converters (DACs) 240, 242, 244, each configured to receive a digital input data signal and to output an analog representation of the received digital input signal to an input IN1, IN2, IN3 of the crossbar array 200. Each output OUT1, OUT2, OUT3 of the crossbar array 200 may be coupled to one of a plurality of analog to digital converters (ADC) 250, 252, 254, each ADC being configured to convert an analog output signal of the crossbar array 200 into a digital representation of the analog output signal.

Figure 3:
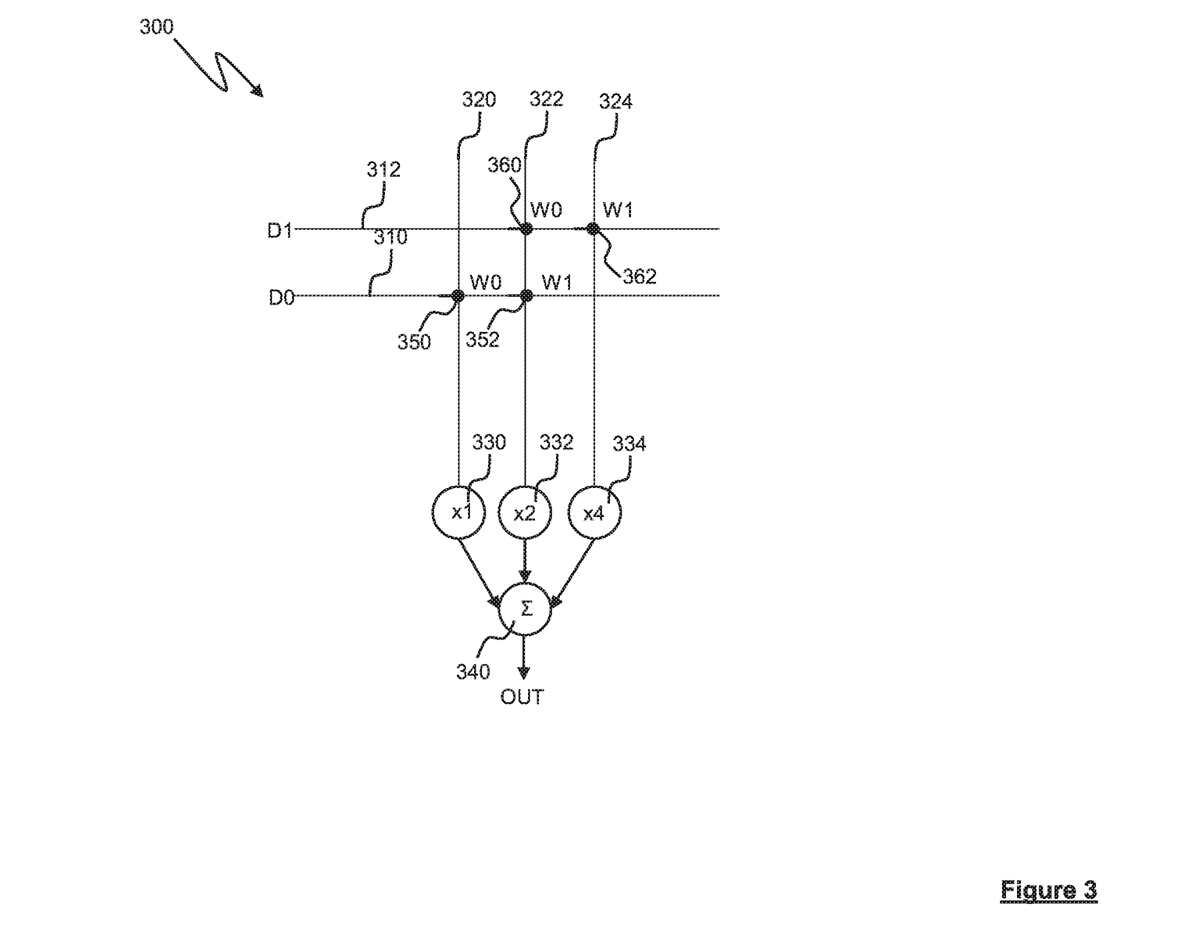
FIG. 3 is a simplified schematic representation of a multiplication operation performed by an analog crossbar array arrangement.

FIG. 3 schematically illustrates the multiplication of a 2-bit data input D by a 2-bit weight W using a crossbar array that implements m-ary arithmetic.

For the purposes of illustration, the crossbar array, shown generally at 300 in FIG. 3, is shown as including first and second row electrodes 310, 312 and first, second and third column electrodes 320, 322, 324. First, second and third multipliers 330, 332, 334 are coupled to output terminals of the first, second and third column electrodes 320, 322, 324 respectively, and are configured to apply binary weighting factors to the partial products output at the output terminals of the column electrodes 320, 322, 324. Thus in this example the first multiplier 330 is configured to multiply the partial product output at the output terminal of the first column electrode 320 by 1, the second multiplier 332 is configured to multiply the partial product output at the output terminal of the second column electrode 322 by 2, and the third multiplier 334 is configured to multiply the partial product output at the output terminal of the third column electrode 320 by 4. A summation unit 340 is coupled to outputs of the multipliers 330, 332, 334 and is configured to output the sum of the outputs of the multipliers 330, 332, 334.

It will be understood that the multipliers 330,332,334 may comprise any suitable system for the multiplication of an input signal, for example a switched capacitor summation network with ratioed capacitors; a scaled or ratioed current mirror network; a passive resistor network such as an R2R ladder; or an op-amp based circuit. It will be further understood that the multipliers may be structurally merged with ADCs, summation units, or accumulators as provided in the system.

The first and second row electrodes 310, 312 receive the constituent bits of the data input D in parallel. In the illustrated example the first row electrode 310 receives a least significant bit D0 of the data input D and the second row electrode 312 receives a most significant bit D1 of the data input D.

Computation elements of the crossbar array 300 are programmed with the constituent bits of the weight W. Thus, a computation element 350 at the intersection of the first row electrode 310 and the first column electrode 320 is programmed with a least significant bit W0 of the weight W, such that the first column electrode 320 outputs the partial product D0·W0. A computation element 352 at the intersection of the first row electrode 310 and the second column electrode 322 is programmed with a most significant bit W1 of the weight W, whilst a computation element 360 at the intersection of the second row electrode 312 and the second column electrode 322 is programmed with a least significant bit W0 of the weight W. Thus, the second column electrode 322 outputs the sum of the partial products D0·W1 and D1·W0. A computation element 362 at the intersection of the second row electrode 312 and the third column electrode 324 is programmed with a most significant bit W1 of the weight W, such that the third column electrode 324 outputs the partial product D1·W1.

The outputs of the column electrodes 320, 322, 324 are multiplied by the binary weighting factors of the multipliers 330, 332, 334 and the summation unit 340 calculates the sum of the outputs of the multipliers 330, 332, 334 to generate an output.

For example, if the weight W is 2 (=1 0 in binary) and the data input D is 2 (=1 0 in binary), then D0=0 and D1=1, and W0=0 and W1=1. The partial product D0·W0 calculated by the computation element 350 and output by the first column electrode 320 is therefore equal to 0, and is multiplied by 1 by the first multiplier 330, which therefore outputs a signal with a value 0. The sum of the partial product D0·W1 calculated by the computation element 352 and the partial product D1·W0 calculated by the computation element 360, which is output by the second column electrode 322 is also equal to 0, and is multiplied by 2 by the second multiplier 332, which therefore also outputs a signal with a value 0. The partial product D1·W1 calculated by the computation element 362 and output by the third column electrode 324 is equal to 1, and is multiplied by 4 by the third multiplier 334, which therefore outputs a signal with a value 4.

The summation unit calculates the sum of the outputs of the multipliers 330, 332, 334, as (0+0+4)=4.

For the purpose of illustration the crossbar array 300 is shown as having only two row electrodes and only three column electrodes, but it will be appreciated that a practical implementation of a crossbar array for use in an analog computing system for an artificial neural network will have significantly more row and column electrodes and associated computation elements and multipliers, since the computation operations performed by the crossbar array will typically involve weights and data of greater than two-bit values. Thus, a practical implementation of a crossbar array of the kind illustrated in FIG. 3 requires a significant number of computation elements and multipliers, and therefore may occupy a significant area of silicon on an integrated circuit and may consume a significant amount of power.

Figure 4:
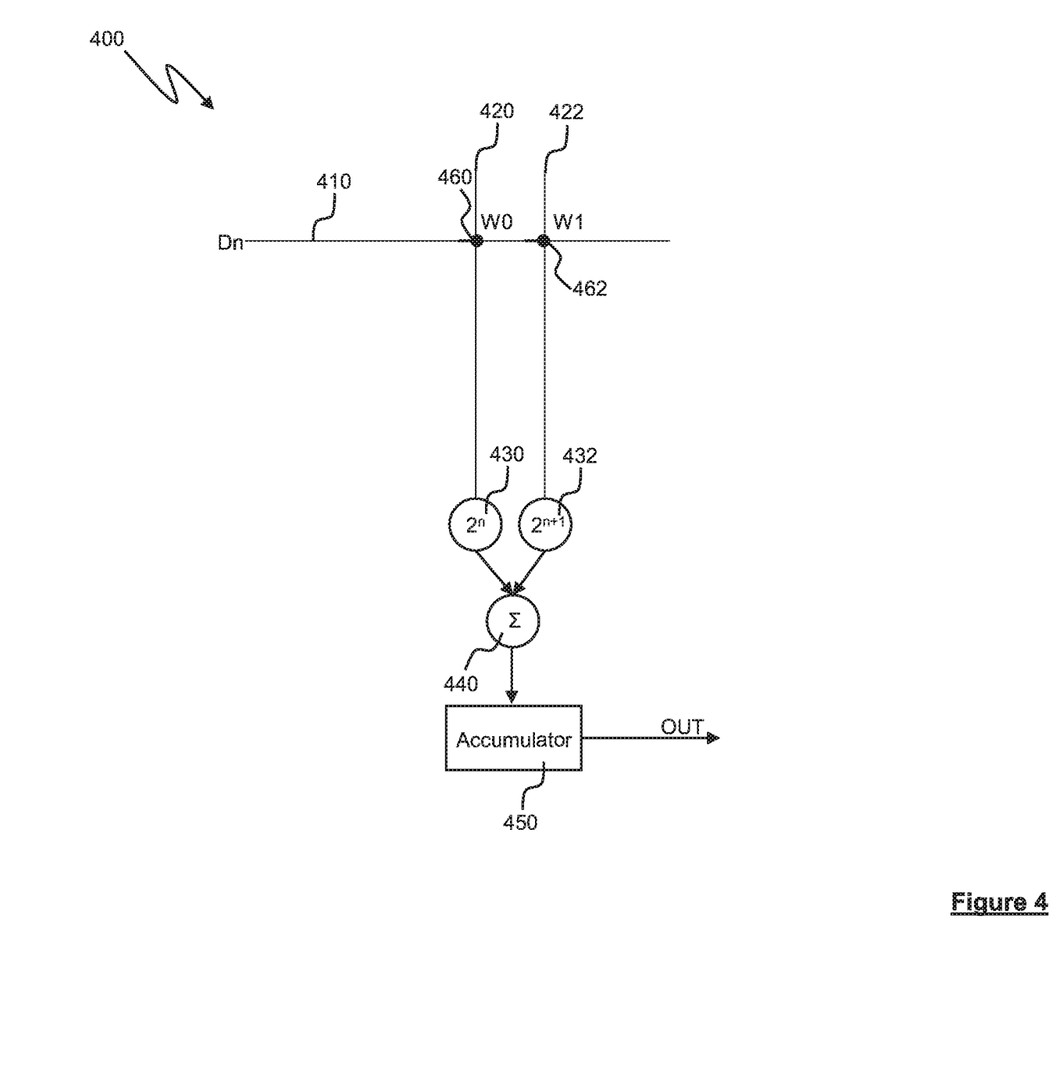
FIG. 4 is a simplified schematic representation of a multiplication operation performed by an alternative analog crossbar array arrangement.

A more efficient (in terms of silicon area and power consumption) crossbar array for performing a multiplication of an input D with a two bit weight W is illustrated schematically in FIG. 4.

This crossbar array (shown generally at 400) includes a single row electrode 410 and first and second column electrodes 420, 422. First and second multipliers 430, 432 are coupled to the outputs of the first and second column electrodes 420, 422 respectively, and a summation unit 440 is coupled to outputs of the multipliers 430, 432. The summation unit 440 is configured to output the instantaneous sum of the outputs of the multipliers 430, 432 to an accumulator 450, which accumulates the outputs of the summation unit 440 over a predetermined time period required to process all of the bits of the input data to generate an output value representing the multiplication of the value of the data input D and the value of the weight W.

A first computation element 460 is provided at the intersection of the row electrode 410 with the first column electrode 420, whilst a second computation element 462 is provided at the intersection of the row electrode 410 with the second column electrode 422.

In use of the crossbar array 400, the first and second computation elements 460, 462 are programmed with a least significant bit W0 and a most significant bit W1 of the weight W, and the constituent bits of the data input D are input to the row electrode 410 as a time-sequenced bitstream (e.g. synchronised with a clock signal). Thus, where the data input is a two-bit value, at a time point t=0 a least significant bit D0 is input to the row electrode 410, and at a subsequent time point t=1 a most significant bit D1 is input to the row electrode 410. More generally, at a time point t=n, a bit Dn of the input data D is input to the row electrode 410.

The binary weighting factors applied by the first and second multipliers 430, 432 are also time sequenced, and are dependent upon which bit in the bitstream of the input D is being input to the row electrode 410. Thus, the binary weighting factor applied by the first multiplier 430 at a time point t=n is equal to $2^n$, whilst the binary weighting factor applied by the second multiplier 432 at the time point t=n is equal to $2^{n+1}$.

The table below shows the value of the input data bit Dn, the partial products calculated by the computation units 460, 462, the outputs of the multipliers 430, 432, the output of the summation unit and the value stored in the accumulator over time in the example where the input data is 2 (binary value 1 0) and the weight is also 2 (binary value 1 0).

| Time point | Dn | Dn.W0 | Dn.W1 | First multiplier o/p | Second multiplier o/p | Summation unit o/p | Accumulator value |
|---|---|---|---|---|---|---|---|
| 0 | 0 | 0 | 0 | 0 | 0 | 0 | 0 |
| 1 | 1 | 0 | 1 | 0 | 4 | 4 | 4 |

Thus, at the end of the predetermined time period required to process all of the bits of the input data, the accumulator 450 outputs a value 4, representing the multiplication of the value of the data input D and the value of the weight W.

Systems of the kind illustrated in FIGS. 2-4 generally operate with a fixed level of accuracy of their outputs, in the sense that the number of bits of the input data D that are processed by the computation elements, the number of bits of the weight W that are used by the computation elements, and the number of bits that are provided for their outputs are fixed. This fixed accuracy approach can lead to difficulties in specifying an appropriate level of output accuracy for a particular application or task to be performed by the system, and in some cases may lead to inefficient use of processing and memory resources and unnecessarily high power consumption, or in extreme cases to an unacceptably low level of output accuracy for the task to be performed.

The present disclosure aims to mitigate this problem, by providing a variable accuracy analog computing system.

Figure 5:
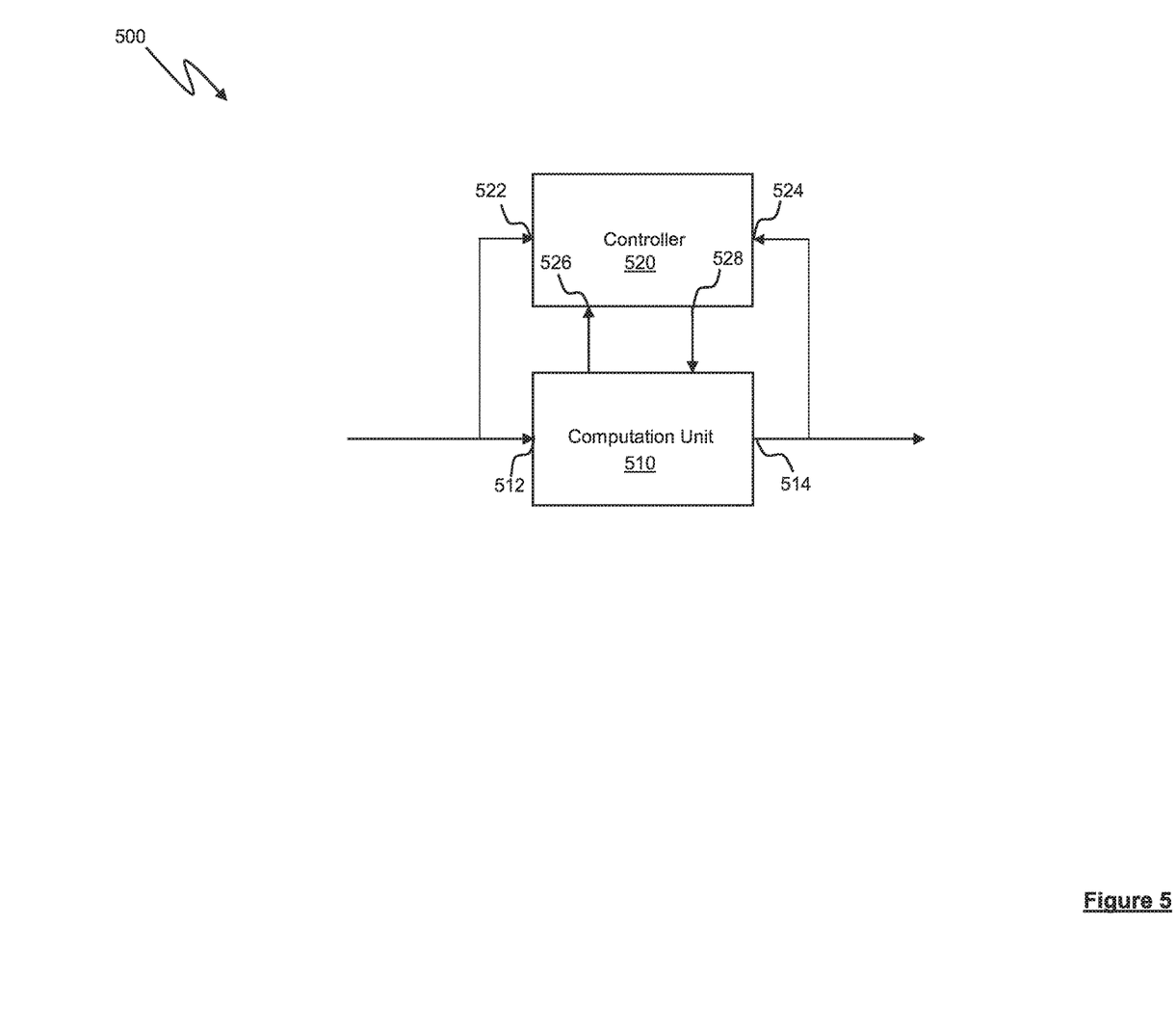
FIG. 5 is a schematic representation of a variable accuracy analog computing system.

FIG. 5 is a schematic representation of a variable accuracy analog computing system which, in the illustrated example, implements an ANN system. As shown generally at 500, the variable accuracy analog computing system includes a computation unit 510 for performing computations on input signals to generate weighted output signals. Thus the computation unit 510 has one or more data inputs 512 for receiving input data signals and one or more outputs 514 for outputting weighted output signals.

The computation unit 510 may comprise one or more crossbar arrays of the kind described above with reference to FIGS. 2-4.

For example, the computation unit 510 may be configured for parallel processing of the constituent bits of a data input signal D, in which case the computation unit may comprise one or more crossbar arrays of the kind described above with reference to FIG. 3.

Alternatively the computation unit 510 may be configured to process the constituent bits of a data input signal D sequentially in time, in which case the computation unit may comprise one or more crossbar arrays of the kind described above with reference to FIG. 4.

The variable accuracy analog computing system 500 also includes a controller 520 which is operative to control a level of accuracy of the output of the computation unit 510, based on one or more parameters of an input signal, an output signal or both. The controller 520 may additionally or alternatively control the level of accuracy of the output of the computation unit 510 based on one or more operating parameters of the computation unit 510.

To this end, the controller 520 may have one or more first inputs 522 for receiving the input data signals and may have one or more second inputs for receiving the output data signals. The controller 520 may also have a third input 526 for receiving signals indicative of operating parameters of the computation unit 510. The controller 520 also has an output 528 for outputting control signals to the computation unit 510 to control the level of accuracy of the output of the computation unit 510.

The control signals output by the controller 520 may, for example, cause the computation unit to adjust the number of bits of the input data D that are processed by the computation unit 510. For example, if a relatively lower accuracy output from the computation unit 510 is acceptable the controller 520 may output one or more control signals to cause the computation unit 510 not to process the least significant bits (e.g. the least significant 4, 2 or 1 bits) of the input data D. Similarly, if a relatively higher accuracy output is required the controller may output one or more control signals to cause the computation unit 510 to process some or all of the least significant bits of the input data D.

If the computation unit 510 is based on one or more crossbar arrays 300 of the kind described above with reference to FIG. 3, then in response to such control signals the computation unit 510 may, for example, disable one or more row electrodes 310, 312, (e.g. by opening one or more row electrode switches to decouple the relevant row electrode(s) from the data input(s)) so as to prevent the least significant bit(s) of the input data D from being used in the computation of the output of the computation unit 510, thereby providing a relatively reduced accuracy output. Alternatively, if a relatively higher accuracy output is required, then in response to such control signals the computation unit 510 may, for example, (re)-enable the relevant row electrode(s) 310, 312 so as to ensure that the relevant bits of the input data D are used in the computation of the output of the computation unit 510.

Alternatively, if the computation unit 510 is based on one or more crossbar arrays 400 of the kind described above with reference to FIG. 4, the computation unit 510 may, in response to control signals from the controller 520, disable the row electrode 410 (e.g. by opening a row electrode switch to decouple the row electrode 410 from the data input), the accumulator 450 (e.g. by decoupling the input of the accumulator 450 from the output of the summation unit 440, or by decoupling the output of the accumulator 450 from the output of the computation unit, using appropriate switches), or both, for a predetermined period of time, so as to ensure that the least significant bits (e.g. the least significant 4, 2 or 1 bits) of the input data are not taken into account when computing the output of the computation unit 510. Alternatively, if a relatively higher accuracy output is required, then in response to such control signals the computation unit 510 may, for example, (re)-enable the row electrode 410 and/or the accumulator 450 so as to ensure that the relevant bits of the input data D are used in the computation of the output of the computation unit 510.

Additionally or alternatively, the control signals output by the controller 520 may cause the computation unit to adjust the number of bits of the weight W that are processed by the computation unit 510. For example, if a relatively lower accuracy output from the computation unit 510 is acceptable the controller 520 may output one or more control signals to cause the computation unit 510 not to use the least significant bits (e.g. the least significant 4, 2 or 1 bits) of the weight W. Similarly, if a relatively higher accuracy output is required the controller may output one or more control signals to cause the computation unit 510 to process some or all of the least significant bits of the weight W.

If the computation unit 510 is based on one or more crossbar arrays 300 of the kind described above with reference to FIG. 3, then in response to such control signals the computation unit 510 may, for example, disable one or more of the column electrodes 320, 322 (e.g. by opening one or more column electrode switches to decouple the relevant column electrode(s) from the corresponding multiplier) so as to prevent the least significant bit(s) of the weight W from being used in the computation of the output of the computation unit 510, thereby providing a relatively reduced accuracy output. Alternatively, if a relatively higher accuracy output is required, then in response to such control signals the computation unit 510 may, for example, (re)-enable the relevant column electrode(s) 320, 322 so as to ensure that the relevant bits of the input data D are used in the computation of the output of the computation unit 510.

Alternatively, if the computation unit 510 is based on one or more crossbar arrays 400 of the kind described above with reference to FIG. 4, the computation unit 510 may, in response to control signals from the controller 520, disable the first column electrode 420 (e.g. by opening a column electrode switch to decouple the first column electrode 430 from the first multiplier 440) so as to ensure that the least significant bit of the weight W is not used in the computation of the output of the computation unit 510, thereby providing a relatively reduced accuracy output. Alternatively, if a relatively higher accuracy output is required, then in response to such control signals the computation unit 510 may, for example, (re)-enable the first column electrode 420 electrode 410 so as to ensure that the least significant bit of the weight W are used in the computation of the output of the computation unit 510.

Additionally or alternatively, the control signals output by the controller 520 may cause the computation unit 510 to adjust the number of bits that are output by the computation unit 510. For example, if a relatively lower accuracy output from the computation unit 510 is acceptable the controller 520 may output one or more control signals to cause the computation unit 510 to output only the most significant bits (e.g. the most significant 4, 2 or 1 bits) of the value output by the summation unit 340 (for a computation unit based on the crossbar array 300 of FIG. 3) or accumulator 450 (for a computation unit 510 based on the crossbar array 400 of FIG. 4). Similarly, if a relatively higher accuracy output is required the controller 520 may output one or more control signals to cause the computation unit 510 to output some or all of the least significant bits of the value output by the summation unit 340 or accumulator 450, in addition to the most significant bits.

Figure 6:
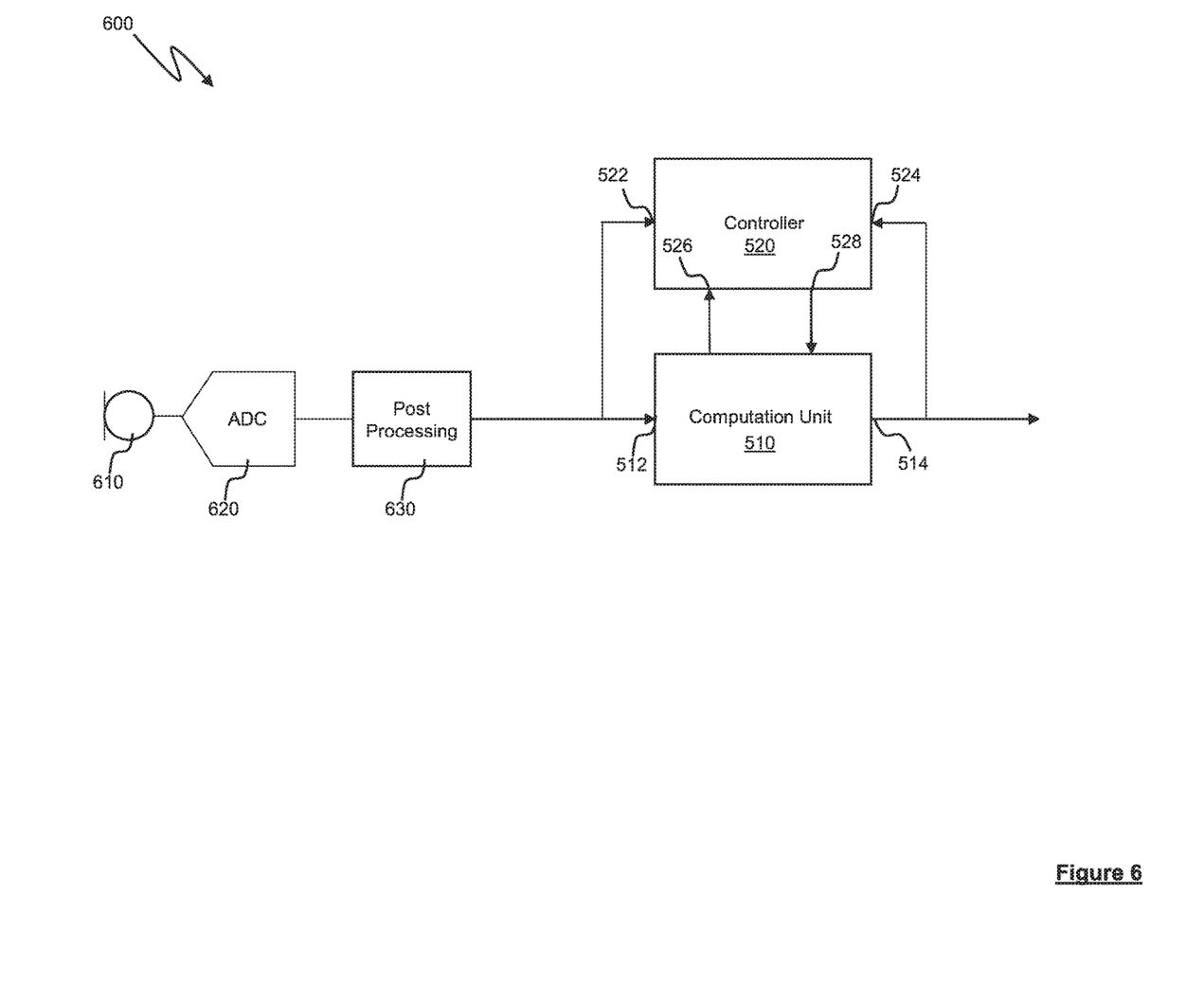
FIG. 6 is a schematic representation of the variable accuracy analog computing system deployed as part of a voice control system for a device such as a mobile telephone.

The parameters of the input signal and/or output signal that are monitored by the controller 520 may vary according to the application for which the system 500 is used. For example, as illustrated in FIG. 6, the system 500 may be used, with appropriate trained weights for the computation unit 510, as part of a voice control system 600 for a device such as a mobile telephone or the like, to process or classify audio signals generated by a microphone 610 or other audio capture device.

Audio signals generated by the microphone 610 may be converted to digital signals by an analog to digital converter (ADC) 620 and subject to post-processing in a post-processing unit 630 such as a digital signal processor (DSP), and the resulting processed digital audio signals may be input to the computation unit 512, which may perform computations on the input digital audio signals using appropriately trained weights for the purpose of classifying the input digital audio signals as either speech or non-speech audio content, for identifying an input digital audio signal as a particular word, sound, prompt or other command, or for identifying or recognising a speaker based on the input digital audio signals, for example.

The controller 520 may be operative to monitor parameters or metrics of the input digital signal. Monitored parameters or metrics may include, for example, a signal to noise ratio (SNR), a noise level, a direct to reverberate ratio (i.e. a metric indicative of the ratio of sound received directly at the microphone 610 to sound received at the microphone via reverberation), a long-term spectrum of the input digital audio signal, an average spectrum of the input digital audio signal over time, a spectral tilt of the input digital audio signal, Mel-frequency cepstral coefficients (MFCCs) present in the input digital audio signal, narrowband interference in the input digital audio signal, an indication of voice activity detection (VAD) input digital audio signal, or a metric indicative of automatic speech recognition (ASR) confidence for the input digital audio signal.

As discussed above, the controller 520 may control a level of accuracy of the output of the computation unit 510 based at least in part on the monitored parameters or metrics of the input signal, by issuing appropriate control signals to the computation unit 510. As one example, if the SNR of the input signal is low, the controller 520 may issue a control signal to the computation unit 510 to increase the level of accuracy of the output of the computation unit 510, such that a potentially low-quality input signal can be compensated for by increased accuracy in the computation unit 510.

Additionally or alternatively, the controller 520 may process or monitor the output of the computation unit 520 to determine and/or monitor parameters or metrics of the output signal. Such parameters or metrics may include, for example, a metric indicative of class discriminability of the output of the computation unit, a difference between the output signal and one or more thresholds, Kullback Leibler (KL) divergence, a statistical distance metric between outputs, or statistics such as the mean, standard deviation (STD), skew or kurtosis of the output signal in comparison to typical values.

The controller 520 may control the level of accuracy of the output of the computation unit 510 based at least in part on the monitored parameters or metrics of the output signal, by issuing appropriate control signals to the computation unit 510.

As discussed above the controller 520 may control the level of accuracy of the output of the computation unit 510 based on a combination of the monitored parameters or metrics of the output signal and the monitored parameters or metrics of the input signal, or may alternatively control the level of accuracy of the output of the computation unit 510 based only on the monitored parameters or metrics of the output signal or on the monitored parameters or metrics of the input signal.

In a further aspect, the system (e.g. the controller 520) may monitor environmental aspects of the computation unit 510 such as supply voltage or temperature, where the operational accuracy of the computation unit 510 may vary due to changes in such environmental conditions. Accordingly, the computation accuracy of the unit 510 may be adjusted based on such environmental changes.

The discussion above has focused on analog computation. The concept of performing computations with variable accuracy on input signals to generate weighted output signals can be extended to digital computation, as will now be described with reference to FIG. 7.

Figure 7:
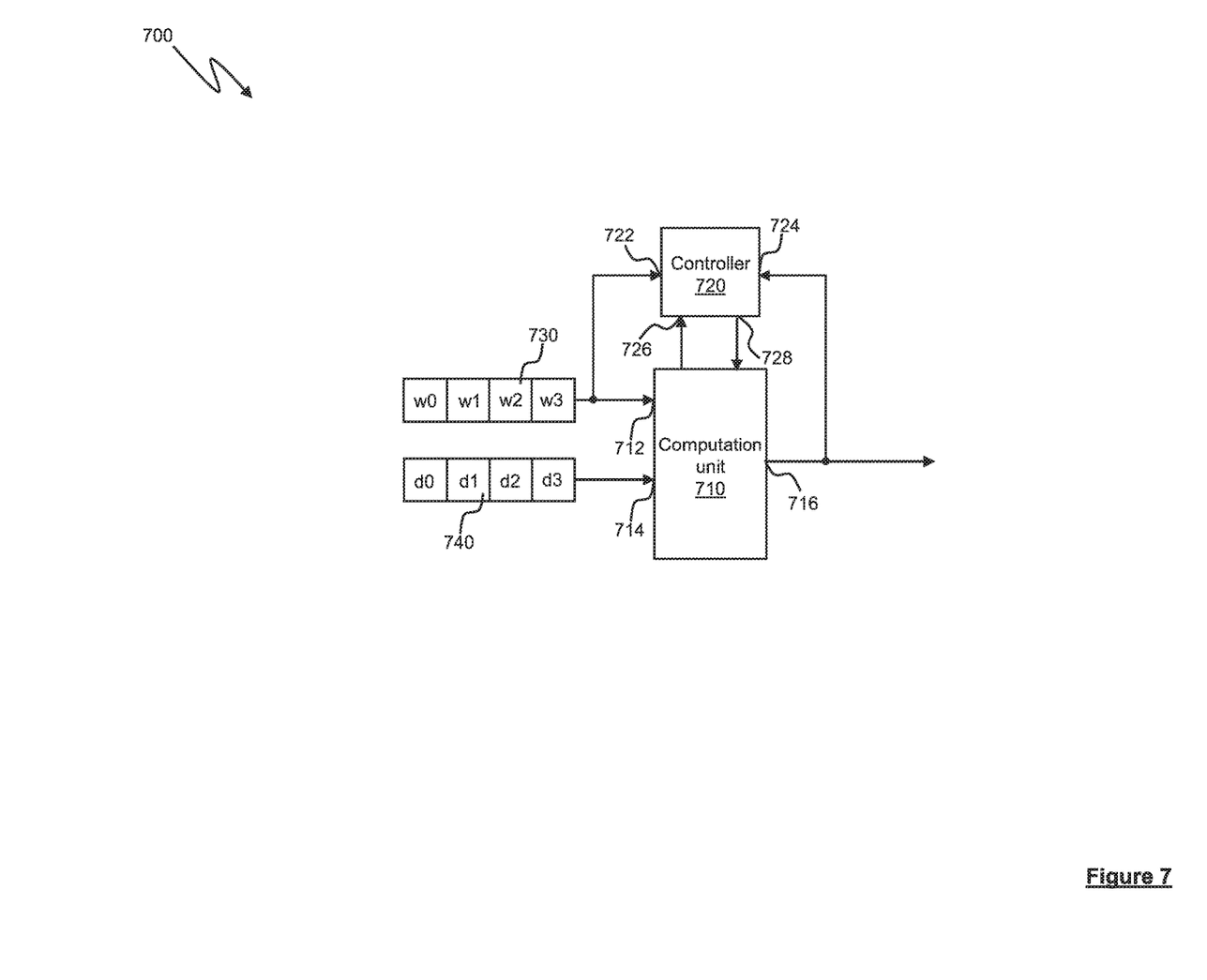
FIG. 7 is a schematic diagram showing parts of a variable accuracy digital computation system.

FIG. 7 is a schematic diagram showing a variable accuracy digital computation system which, in the illustrated example, implements an ANN system. As shown generally at 700, the variable accuracy digital computing system includes a digital computation unit 710 for performing computations on input signals to generate weighted output signals. In the illustrated example the digital computation unit 710 is a single multiply-accumulate (MAC) unit, but it will be appreciated that alternative multiply-accumulate configurations (e.g. a digital multiply unit and a separate digital accumulate unit) could equally be employed.

The digital computation unit 710 has a first, weight, input 712 for receiving weight data from a weight register 730 and a second, data, input 714 for receiving input data from an input data register 740. The digital computation unit 710 also has one or more outputs 716 for outputting weighted output signals.

For reasons of clarity and simplicity, in the illustrated example the weight register 720 and the data register 730 are four-bit registers (i.e. are capable of storing 4 bits each), but it will be appreciated that the weight register 730 and the data register 740 could be of any convenient size.

The digital computation unit 710 operates in a bit-serial manner, i.e. the digital computation unit 710 sequentially performs computations using one weight bit and the corresponding data bit per clock cycle. In the illustrated example the digital computation unit 710 is configured to perform computations in increasing order of bit significance (i.e. least significant bit first), such that in a first clock cycle the digital computation unit 710 performs a computation using the least significant bit (LSB) w0 of the weight data and the corresponding LSB d0 of the input data. In the next clock cycle the digital computation unit 710 performs a computation using the next least significant bit w1 of the weight data and the corresponding next least significant bit d21 of the input data, and so on.

In operation of the variable accuracy digital computing system 700, the weight register 730 is loaded with the bits w0-w3 of a weight W and the data register 740 is loaded with the bits d0-d3 of a data input signal D. The computation unit 710 multiplies each bit of the weight W with the corresponding bit of the input data signal D, and adds the result of the multiplication to an accumulator value which is output at the output 716. Thus, for a four-bit weight W and a four-bit input data signal D, four clock cycles will be required before the accumulator value at the output 716 represents the result of the multiplication of the input data signal D by the weight W. A bit-shifter (not shown in FIG. 7) such as a barrel-shifter may be provided to bit-shift the accumulator value at the end of each clock cycle, to ensure that the constituent bits of the accumulator value at the end of the computation of W·D are correctly positioned and thus provide an accurate value for W·D. This is illustrated in the table below, which shows the accumulator value for each clock cycle.

| Clock cycle | Accumulator value |
|---|---|
| 1 | w0.d1 |
| 2 | (w0.d0)/2 + w1.d1 |
| 3 | ((w0.d0)/2 + w1.d1)/2 + w2.d2 |
| 4 | (((w0.d0)/2 + w1.d1)/2 + w2.d2)/2 + w3.d3 |

After a number of clock cycles equal to the number of bits in the input data and the weight (i.e. 4 in this example) logic circuitry (not shown), which may be internal to or external to the computation unit 710 resets the accumulator value to zero, such that the computation unit 710 can perform a new computation for a new weight W and a new input data signal D.

The variable accuracy digital computing system 700 also includes a controller 720 which is operative to control a level of accuracy of the output of the computation unit 710, based on one or more parameters of an input signal, an output signal or both. The controller 720 may additionally or alternatively control the level of accuracy of the output of the computation unit 710 based on one or more operating parameters of the computation unit 710.

To this end, the controller 720 may have one or more first inputs 722 for receiving the input data signals and may have one or more second inputs for receiving the output data signals. The controller 720 may also have a third input 726 for receiving signals indicative of operating parameters of the computation unit 710. The controller 720 also has an output 728 for outputting control signals to the computation unit 710 to control the level of accuracy of the output of the computation unit 710.

The control signals output by the controller 720 may, for example, cause the computation unit 710 to adjust the number of bits of the input data D that are processed by the computation unit 710. For example, if a relatively lower accuracy output from the computation unit 710 is acceptable the controller 720 may output one or more control signals to cause the computation unit 710 not to process the least significant bits (e.g. the least significant 4, 2 or 1 bits) of the input data D, e.g. by disabling the data input 714 after, e.g., 4, 2 or 1 clock cycles. Similarly, if a relatively higher accuracy output is required the controller may output one or more control signals to cause the computation unit 710 to process some or all of the least significant bits of the input data D.

Additionally or alternatively, the control signals output by the controller 720 may cause the computation unit 710 to adjust the number of bits of the weight W that are processed by the computation unit 710. For example, if a relatively lower accuracy output from the computation unit 710 is acceptable the controller 720 may output one or more control signals to cause the computation unit 710 not to use the least significant bits (e.g. the least significant 4, 2 or 1 bits) of the weight W, e.g. by disabling the weight input 712 after, e.g., 4, 2 or 1 clock cycles. Similarly, if a relatively higher accuracy output is required the controller may output one or more control signals to cause the computation unit 710 to process some or all of the least significant bits of the weight W.

Additionally or alternatively, the control signals output by the controller 720 may cause the computation unit 710 to adjust the number of bits that are output by the computation unit 710. For example, if a relatively lower accuracy output from the computation unit 710 is acceptable the controller 720 may output one or more control signals to cause the computation unit 710 to output only the most significant bits (e.g. the most significant 4, 2 or 1 bits) of the accumulation value, e.g. by disabling the output 176 after 4, 2 or 1 clock cycles. Similarly, if a relatively higher accuracy output is required the controller 720 may output one or more control signals to cause the computation unit 710 to output some or all of the least significant bits of the accumulation value, in addition to the most significant bits.

Thus the variable accuracy digital computation system 700 of FIG. 7 may provide an output signal whose accuracy can be varied based on one or more parameters of an input signal, an output signal or both, or based on one or more operating parameters of the computation unit 710.

In the description above the input data signal D and the weight W are assumed to be conventional decimal values that are represented by a plurality (4, in the illustrated example) of conventional bits. In alternative examples the input data signal D and/or the weight W could take some other format. For example, the input data signal and/or the weight W could be, or could be represented by or encoded as, unums (universal numbers), posits or variable accuracy posits. In such examples the accuracy of a weighted output signal may be varied as explained above, by varying the number of bits of the input data signal and/or the weight that are used in a computation and/or by restricting the number of bits of the accumulation value that are output by the computation unit 710.

The variable accuracy digital computation system 700 of FIG. 7 may be used in place of the variable accuracy analog computation system 500 in the voice control system 600 shown in FIG. 6.

As will be apparent from the foregoing discussion, the variable accuracy computing systems of the present disclosure facilitate a balance between output accuracy, power consumption and efficient use of processing and memory resources, as the accuracy of the output of the computing unit can be tailored to the requirements of a specific application, and adjusted according to power consumption and efficiency constraints.

The variable accuracy computing systems described above with reference to FIGS. 5 and 7 may be implemented as one or more integrated circuits. Such a system (whether implemented as integrated circuits or otherwise) may be integrated into a devices such as a mobile telephone, tablet or laptop computer, Internet of Things (IoT) device or the like.

Figure 8:
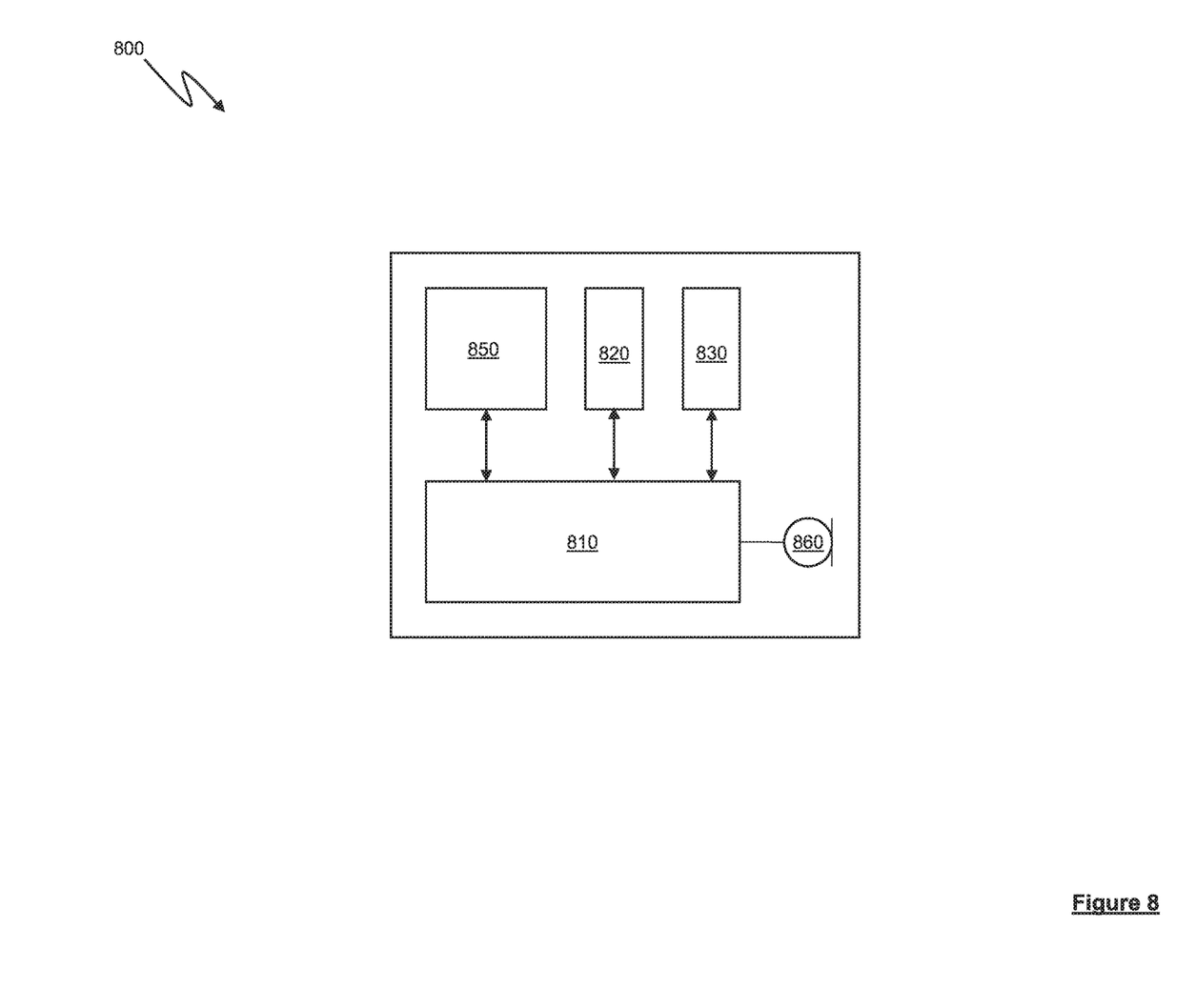
FIG. 8 is a schematic representation of a device incorporating a variable accuracy computing system.

FIG. 8 is a schematic representation of such a device. The device, shown generally at 800 in FIG. 8, may be an edge device such as a mobile telephone, tablet or laptop computer, IoT device or the like. The device 800 includes a processing unit 810, embodied on one or more integrated circuits, which may be, for example, an application processor. The device further includes memory 820 communicatively coupled to the processing unit 810, and a communications subsystem 830 which is also communicatively coupled to the processing unit 810 to permit the device 800 to communicate with systems and devices external to the device 800. The device further includes an integrated circuit 850 that implements a variable accuracy analog computing system 500 of the kind described above with reference to FIG. 5 or a variable accuracy digital computing system 700 of the kind described above with reference to FIG. 7. A digital or analog microphone or other audio capture device or subsystem 860 may also be provided, coupled to the processing unit 810 to provide audio data to the processing unit 810. The integrated circuit 850 is communicatively coupled to the processing unit 810 for receiving input data from and transmitting output data to the processing unit 810.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A computing system comprising:
a data input configured to receive an input data signal;
a computation unit having an input coupled with the data input, the computation unit being operative to apply a weight to an input data signal received at its input to generate a weighted output signal; and
a controller;
wherein the controller is configured to monitor a parameter of the input data signal and/or a parameter of the weighted output signal and to issue a control signal to the computation unit to control a level of accuracy of the weighted output signal based at least in part on the monitored parameter; and
wherein the computation unit is a digital computation unit configured to perform bit-series computation of bits of the input data signal and the weight.

2. A computing system according to claim 1 wherein in response to the control signal the computation unit is operative to adjust a number of bits of the input data signal that are used by the computation unit to generate the weighted output signal.

3. A computing system according to claim 2 wherein the computation unit is operative to prevent use of one or more least significant bits of the input data signal from being used by the computation unit to generate the weighted output signal.

4. A computing system according to claim 1 wherein in response to the control signal the computation unit is operative to adjust a number of bits of the weight that are used by the computation unit to generate the weighted output signal.

5. A computing system according to claim 4 wherein the computation unit is operative to prevent use of one or more least significant bits of the weight from being used by the computation unit to generate the weighted output signal.

6. A computing system according to claim 1 wherein in response to the control signal the computation unit is operative to adjust a number of bits that are provided for the weighted output signal.

7. A computing system according to claim 1 wherein the input data signal comprises an audio signal.

8. A computing system according to claim 1 wherein the parameter of the input signal monitored by the controller comprises one or more of:
a signal to noise ratio;
a noise level;
a direct to reverberate ratio;

an average spectrum;
a spectral tilt;
Mel-frequency cepstral coefficients (MFCCs) or a property derived therefrom;
a long-term spectrum of the input signal;
an indication of narrowband interference in the input signal;
an indication of voice activity detection (VAD) in the input signal; and/or
an indication of automatic speech recognition (ASR) confidence for the input signal.

9. A computing system according to claim 1 wherein the parameter of the output signal monitored by the controller comprises one or more of:
a metric indicative of class discriminability of the output of the computation unit;
a difference between the output signal and one or more thresholds;
Kullback Leibler (KL) divergence;
a statistical distance metric between outputs of the computation unit;
a mean, standard deviation (STD), skew or kurtosis of the output signal in comparison to typical values.

10. A computing system according to claim 1 wherein the computation unit comprises a crossbar array, wherein the crossbar array is configured to perform parallel computation on bits of the input data signal, or to perform computation on bits of the input data signal sequentially.

11. A computing system according to claim 10 wherein the crossbar array comprises:
a plurality of row electrodes, each of the plurality of row electrodes having a respective input terminal;
a plurality of column electrodes, each of the plurality of column electrodes having a respective output terminal; and
a plurality of computation elements,
wherein each of the plurality of computation elements is coupled to one of the plurality of row electrodes and to one of the plurality of column electrodes, and is configured to output a signal representative of the product of a value of a signal received at the input terminal of the row electrode to which it is coupled and a weight value associated with the computation element, and
wherein in response to receiving a control signal from the controller to reduce the level of accuracy of the output of the computation unit, the computation unit is operative to:
disable one or more of the row electrodes; or
disable one or more of the column electrodes.

12. A computing system according to claim 11 wherein the crossbar array further comprises:
a plurality of multipliers, each of the plurality of multipliers having an input coupled to the output terminal of a respective one of the plurality of column electrodes; and
a summation unit coupled to outputs of the plurality of multipliers, the summation unit being operative to output a signal representing a sum of values represented by the outputs of the plurality of multipliers,
wherein each of the plurality of multipliers is configured to apply a binary weighting to a signal received at its input and to output a binary weighted signal to the summation unit.

13. A computing system according to claim 10 wherein the crossbar array comprises:
a row electrode having an input terminal;
a plurality of column electrodes, each of the plurality of column electrodes having a respective output terminal; and
a plurality of computation elements,
wherein each of the plurality of computation elements is coupled to the row electrode and to one of the plurality of column electrodes, and is configured to output a signal representative of the product of a value of a signal received at the input terminal of the row electrode and a weight value associated with the computation element, and
wherein in response to receiving a control signal from the controller to reduce the level of accuracy of the output of the computation unit, the computation unit is operative to:
disable the row electrode for a predetermined period of time; or
disable one or more of the column electrodes for a predetermined period of time.

14. A computing system according to claim 13 wherein the crossbar array further comprises:
a plurality of multipliers, each of the plurality of multipliers having an input coupled to the output terminal of a respective one of the plurality of column electrodes;
a summation unit coupled to outputs of the plurality of multipliers, the summation unit being operative to output a signal representing a sum of values represented by the outputs of the plurality of multipliers; and
an accumulator coupled to an output of the summation unit;
wherein each of the plurality of multipliers is configured to apply a binary weighting to a signal received at its input and to output a binary weighted signal to the summation unit.

15. A computing system according to claim 1 wherein the computing system comprises analog neural network circuitry.

16. A computing system according to claim 1 wherein the controller is operative to monitor an environmental parameter of the computation unit and to issue a control signal to the computation unit to control a level of accuracy of the weighted output signal based at least in part on the monitored environmental parameter, wherein the environmental parameter comprises a supply voltage or a temperature of the computation unit.

17. An integrated circuit comprising a computing system according to claim 1.

18. A device comprising an integrated circuit according to claim 17, wherein the device is a mobile telephone, a tablet or laptop computer or an Internet of Things (IoT) device.

19. A computing method comprising:
receiving, at a data input of an analog computing system, an input data signal;
applying, by a computation unit having an input coupled with the data input, a weight to an input data signal received at its input to generate a weighted output signal; and
monitoring, by a controller, a parameter of the input data signal and/or a parameter of the weighted output signal and to controlling, by the controller, a level of accuracy of the weighted output signal based at least in part on the monitored parameter;
wherein the computation unit is a digital computation unit configured to perform bit-series computation of bits of the input data signal and the weight.

20. A computing system comprising:
a data input configured to receive an input data signal;

a computation unit having an input coupled with the data input, the computation unit being operative to apply a weight to an input data signal received at its input to generate a weighted output signal; and a controller;

wherein the controller is configured to monitor a parameter of the input data signal and/or a parameter of the weighted output signal and to issue a control signal to the computation unit to control a level of accuracy of the weighted output signal based at least in part on the monitored parameter; and wherein the computing system comprises analog neural network circuitry.

21. A computing system comprising:

a data input configured to receive an input data signal;

a computation unit having an input coupled with the data input, the computation unit being operative to apply a weight to an input data signal received at its input to generate a weighted output signal; and a controller;

wherein the controller is configured to monitor a parameter of the input data signal and/or a parameter of the weighted output signal and to issue a control signal to the computation unit to control a level of accuracy of the weighted output signal based at least in part on the monitored parameter;

wherein the computation unit comprises a crossbar array, wherein the crossbar array is configured to perform parallel computation on bits of the input data signal, or to perform computation on bits of the input data signal sequentially.

* * * * *